United States Patent
Huang

(10) Patent No.: US 9,354,400 B2
(45) Date of Patent: May 31, 2016

(54) OPTICAL SIGNAL COUPLING ASSEMBLY

(71) Applicant: HON HAI PRECISION INDUSTRY CO., LTD., New Taipei (TW)

(72) Inventor: Po-Wei Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/543,471

(22) Filed: Nov. 17, 2014

(65) Prior Publication Data
US 2015/0185424 A1    Jul. 2, 2015

(30) Foreign Application Priority Data
Dec. 27, 2013    (TW) .............................. 102148909 A

(51) Int. Cl.
*G02B 6/36* (2006.01)
*G02B 6/38* (2006.01)

(52) U.S. Cl.
CPC ............ *G02B 6/3853* (2013.01); *G02B 6/3885* (2013.01); *G02B 6/3652* (2013.01); *G02B 6/3826* (2013.01); *G02B 6/3858* (2013.01); *G02B 6/3893* (2013.01)

(58) Field of Classification Search
None
See application file for complete search history.

(56) References Cited

U.S. PATENT DOCUMENTS

| | | | | |
|---|---|---|---|---|
| 2011/0064357 A1* | 3/2011 | Chang | ...................... | G02B 6/32 385/33 |
| 2011/0103752 A1* | 5/2011 | Little et al. | ............... | G02B 6/32 385/93 |
| 2012/0251052 A1* | 10/2012 | Hsu | ...................... | G02B 6/3885 385/74 |
| 2014/0193120 A1* | 7/2014 | Hodge et al. | ......... | G02B 6/3885 385/79 |

* cited by examiner

*Primary Examiner* — Mike Stahl
(74) *Attorney, Agent, or Firm* — Novak Druce Connolly Bove + Quigg LLP

(57) ABSTRACT

An clip-together optical signal coupling assembly includes a first connector and a second connector. The first connector includes a first main body and first optical coupling lenses. The second connector includes a plurality of second optical coupling lenses. The first connector includes a cover matched with the first main body, the first main body comprising a first top surface, a first bottom surface and a first outside surface connecting the first top surface and the first bottom surface together. The first top surface defines a first recess, with a first inner side surface defining a first fixing portion. The cover includes a second outside surface with a second fixing portion which functions with the first fixing portion to fix the cover to the first main body.

18 Claims, 5 Drawing Sheets

OPTICAL SIGNAL COUPLING ASSEMBLY

FIELD

The subject matter herein generally relates to fiber optic communications.

BACKGROUND

In the field of fiber optic communications, an optical signal coupling assembly often includes a first connector and a second connector coupling to the first connector to realize transmission of optical signals. Transmission quality of the optical signals is determined by the alignment between the first connector and the second connector.

BRIEF DESCRIPTION OF THE DRAWINGS

Implementations of the present technology will now be described, by way of example only, with reference to the attached figures.

DETAILED DESCRIPTION

Figure 1:
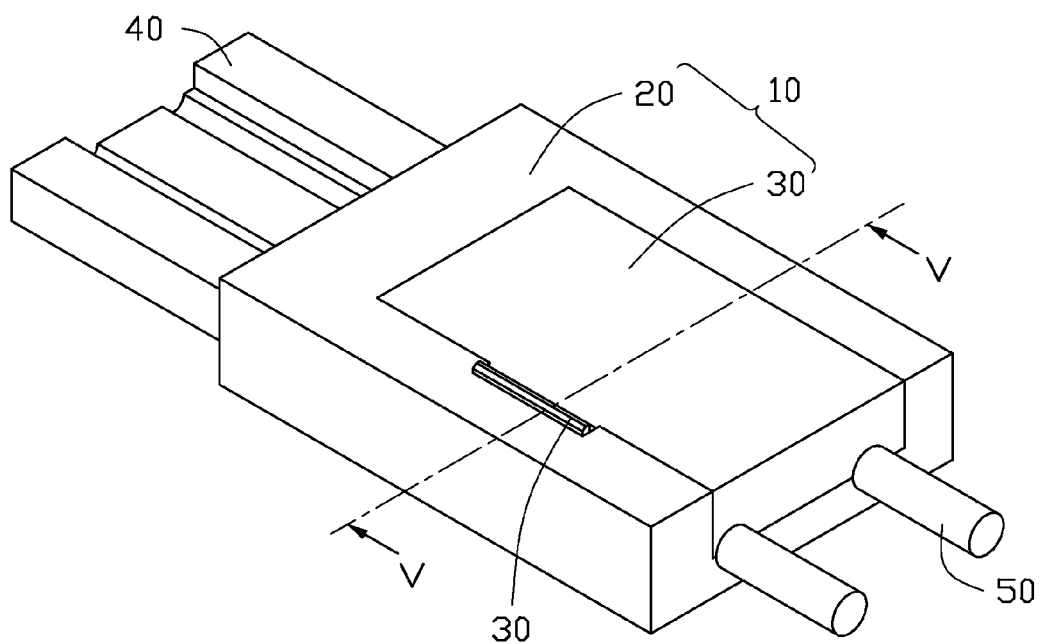
FIG. 1 is an isometric view of an optical signal coupling assembly which includes a first connector in accordance with a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 shows an optical signal coupling assembly 100. The optical signal coupling assembly 100 includes a first connector 10 and a second connector 40 coupling to the first connector 10.

Figure 2:
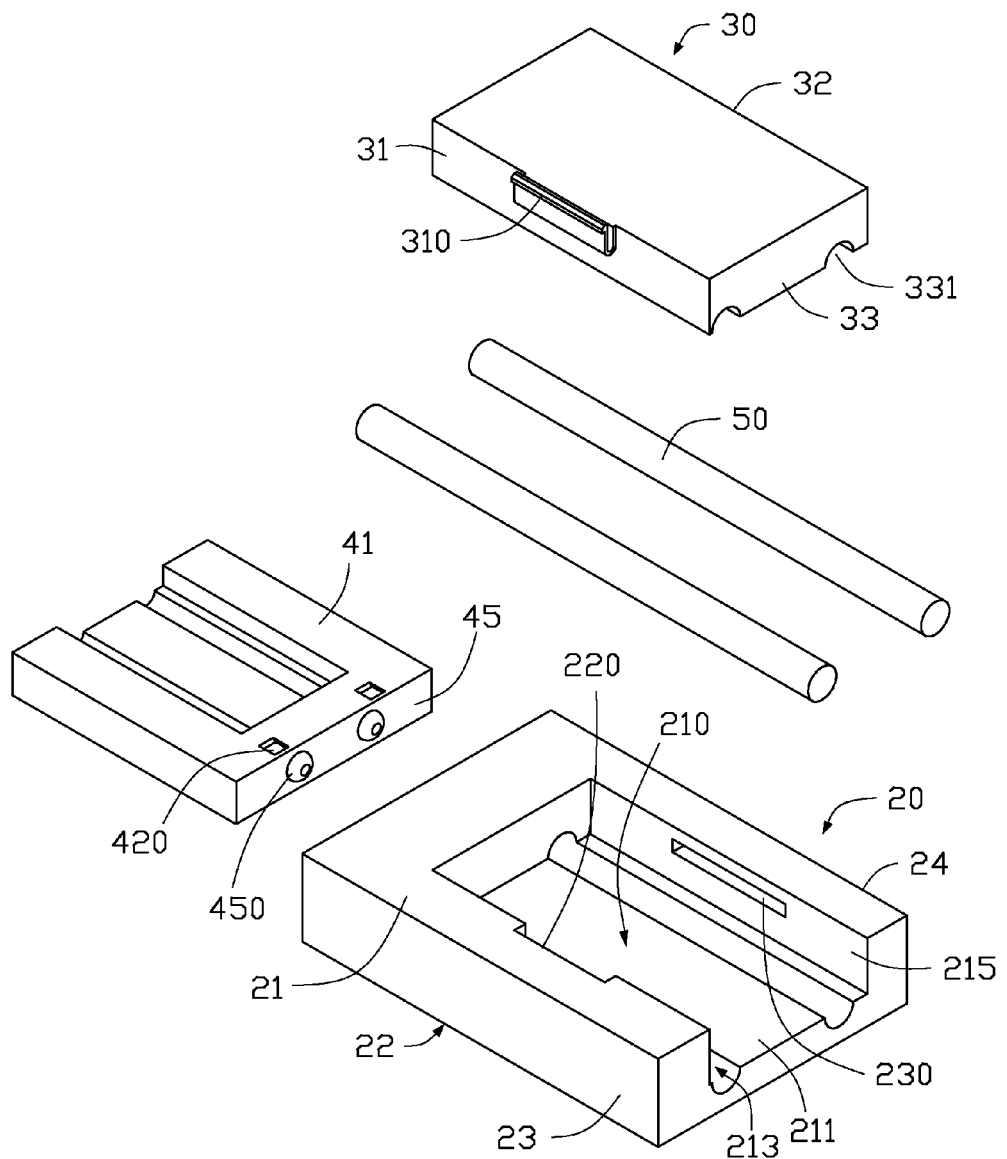
FIG. 2 is an exploded isometric view of the optical signal coupling assembly of FIG. 1.

The first connector 10 includes a first main body 20 and a cover 30, as shown in FIG. 1. The first main body 20 is substantially a cuboid and includes a first top surface 21, a first bottom surface 22, a first outside surface 23, a first butting surface 25, and a fourth outside surface 24, as shown in FIG. 2. The first top surface 21 defines a first recess 210. The first recess 210 includes a first inner side surface 213 parallel to the first outside surface 23, a second inner side surface 215 opposite to the first inner side surface 213, and a first carrying surface 211 connecting the first inner side surface 213 and the second inner side surface 215. The first inner side surface 213 defines a first fixing portion 220 and the second inner side surface 215 defines a slot 230. In the illustrated embodiment, the slot 230 is strip shaped. The first fixing portion 220 is a receiving indentation, the receiving indentation is opened from the top surface 21 and the first inner side surface 213. The first carrying surface 211 defines a number of first fixed grooves 2110, the first fixed grooves 2110 are substantially parallel to each other.

Figure 4:
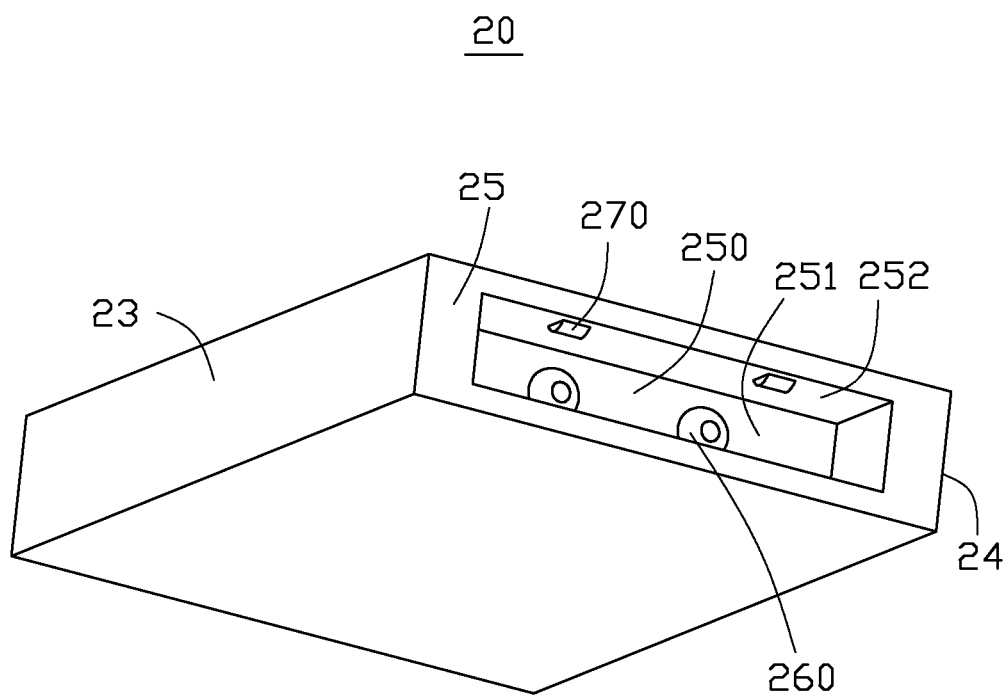
FIG. 4 is an isometric view of the first connector from FIG. 1.

The first butting surface 25 defines an opening 250 as shown in FIG. 4. The opening 250 comprises a coupling surface 251 parallel to the first butting surface 25 and an inner wall 252 perpendicularly connecting with the coupling surface 251. The first optical coupling lenses 260 are arranged on the coupling surface 251. The inner wall 252 comprises a first position member 270. In the illustrated embodiment, a quantity of the first position member 270 is two. The second position member 270 is an arc bump protruding from the inner wall 252.

Figure 3:
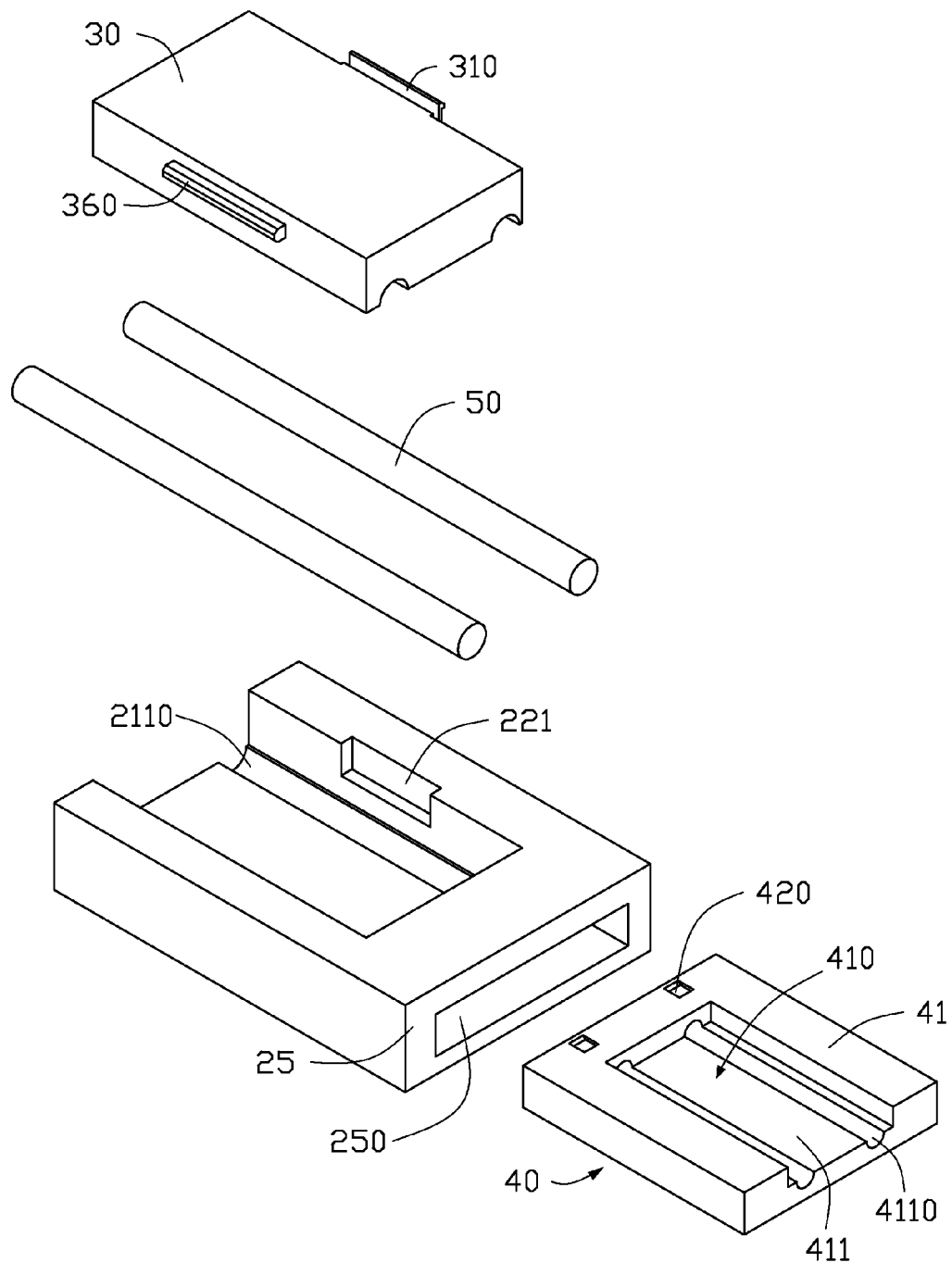
FIG. 3 is similar to FIG. 2, but viewed from another angle.

The cover 30 includes a second outside surface 31, a third outside surface 32 opposite to the second outside surface 31, and a supporting surface 33 connecting the second outside surface 31 and the third outside surface 32, as shown in FIG. 2 and FIG. 3. The second outside surface 31 includes a second fixing portion 310 matching with the first fixing portion 220. The third outside surface 32 includes a convex protrusion 360 matching with the slot 230. The supporting surface 33 defines a number of second fixed grooves 331 which are aligned with the first fixed grooves 2110. The second fixed grooves 331 and the first fixed grooves 2110 are together used for receiving and locating the optical fibers 50.

Figure 5:
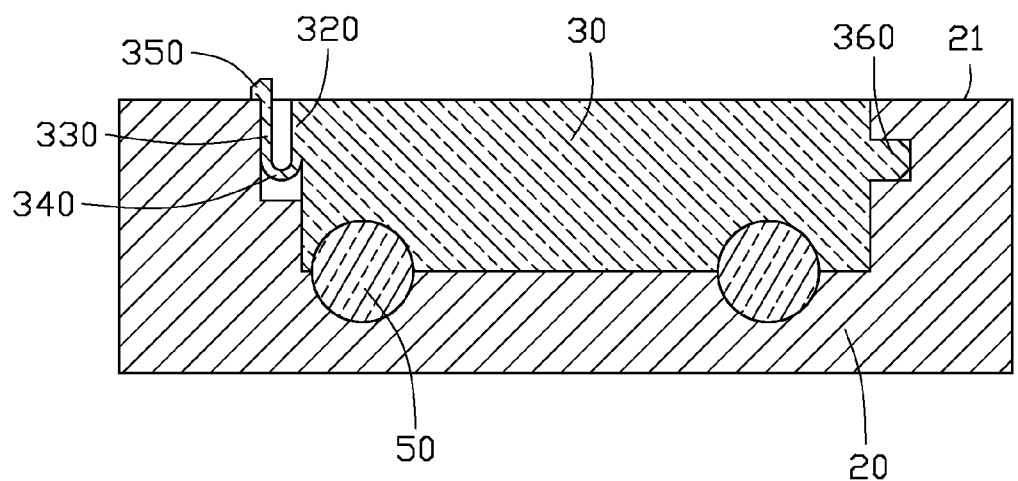
FIG. 5 is a cross sectional view of the optical signal coupling assembly taken along line V-V of FIG. 1.

The second fixing portion 310 is substantially U-shaped and has flexibility, as shown in FIG. 2 and FIG. 5. The second fixing portion 310 includes a first section 320, a second section 330, a connecting section 340 connecting the first section 320 and the second section 330, and an operation end 350 at a free end of the second section 330. The first section 320 is connected with the second outside surface 31. The cover 30 and the second fixing portion 310 are integrally formed which simplifies the manufacturing process of the first connector 10. The first fixing portion 220 and the second fixing portion 310 function together to fix the cover 30 to the first main body 20.

FIG. 2 illustrates the second connector 40 as being substantially a cuboid which includes a second top surface 41 and a second butting surface 45 perpendicularly connected with the second top surface 41. The second top surface 41 defines a second recess 410. The second recess 410 includes a second carrying surface 411. The second carrying surface 411 defines a number of third fixed grooves 4110, the third fixed grooves 4110 are substantially parallel to each other and configured for receiving optical fibers 50. A number of second coupling lenses 450 are arranged on the second butting surface 45. One end of the second top surface 41 close to the second optical coupling lenses 450 further comprises a second position member 420. The second position member 420 is a receiving groove and a quantity of the second position members 420 is two. The second position member 420 matches with the first position member 270.

In assembly, the convex protrusion 360 of the cover 30 is inserted into the slot 230 and the operation end 350 is pressed to close the second section 330 towards the first section 320, and thereby the cover 30 is assembled into the first main body 20. Then, the second connector 40 is plugged into the first main body 20, and the first position member 270 is received in the second position member 420 of the second connector 40. The second butting surface 45 faces the coupling surface 251 and the first optical coupling lenses 260 are aligned with the second optical coupling lenses 450. A path for optical signals between the first optical coupling lenses 260 and the second optical coupling lenses 450 is thus created.

To disassemble the first connector 10, the operation ends 350 are again pressed toward the first section 320, enabling the second fixing portion 310 to slide out of the first fixing portion 222, and the cover 30 is thus disengaged from the first connector 20

To disassemble the optical signal coupling assembly 100, the second connector 40 is extracted from the first main body 10, and the first position member 270 is slid out from the second position member 420, the first connector 10 is thus disengaged from the second connector 20.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical signal coupling assembly comprising:
   a first connector comprising a first main body and a plurality of first optical coupling lenses arranged on the first main body;
   a second connector matched with the first connector and comprising a plurality of second optical coupling lenses optically coupling with the first optical coupling lenses;
   wherein the first connector further comprises a cover matched with the first main body, the first main body comprises a first top surface, a first bottom surface and a first outside surface connecting the first top surface and the first bottom surface, the first top surface defines a first recess, the first recess comprises a first inner side surface parallel to the first outside surface, the first inner side surface defines a first fixing portion, the cover comprises a second outside surface, the second outside surface comprises a second fixing portion matched with the first fixing portion, the first fixing portion and the second fixing portion are together configured for fixing the cover with the first main body.

2. The optical signal coupling assembly of claim 1, wherein the first fixing portion is a cutout, the cutout is opened from the top surface and the first inner side surface.

3. The optical signal coupling assembly of claim 2, wherein the second fixing portion is substantially U-shaped.

4. The optical signal coupling assembly of claim 3, wherein the first second fixing portion comprises a first section, a second section, a connecting section connecting the first section and the second section, and an operation end at a free end of the second section, the first section is connected with the second outside surface.

5. The optical signal coupling assembly of claim 4, wherein the first main body is substantially a cuboid and further comprises a first butting surface perpendicularly connecting with the first outside surface, the first butting surface defines an opening configured for receiving one end of the second connector, the opening comprises a coupling surface parallel to the first butting surface, and an inner wall perpendicularly connecting with the coupling surface, the first optical coupling lenses are arranged on the coupling surface.

6. The optical signal coupling assembly of claim 5, wherein the second connector is substantially a cuboid and further comprises a second butting surface toward the first butting surface, the second optical coupling lenses are arranged on the second butting surface and corresponded with the first coupling lenses.

7. The optical signal coupling assembly of claim 6, wherein the inner wall comprises a first position member.

8. The optical signal coupling assembly of claim 7, wherein the second connector comprises a second top surface, one end of the second top surface close to the second optical coupling lenses further comprises a second position member matches with the first position member, the first position member and the second position member are configured for fixing the first main body with the second connector and enabled the plurality of first optical coupling lenses to be aligned with the plurality of second optical coupling lenses.

9. The optical signal coupling assembly of claim 7, wherein a quantity of the first position member is two, and each first position member is an arc bump, a quantity of the second position member is two, and each second position member is receiving groove.

10. The optical signal coupling assembly of claim 9, wherein the first recess comprises a second inner side surface opposite to the first inner side surface, the second inner side surface defines a guide slot.

11. The optical signal coupling assembly of claim 10, wherein the cover comprises a third outside surface opposite to the second outside surface, the third outside surface comprises a convex protrusion matched with the guide slot.

12. The optical signal coupling assembly of claim 11, wherein the first main body comprises a first carrying surface perpendicularly connecting with first inner side surface, the first carrying surface defines a plurality of first fixed grooves which are substantially parallel to each other and correspond with the first optical coupling lenses.

13. The optical signal coupling assembly of claim 12, wherein the second connector further comprises a second carrying surface, the second carrying surface comprises a number of second fixed grooves which are substantially parallel to each other.

14. An optical signal coupling assembly comprising:
   a first connector having:
      a first main body with:
         a plurality of first optical coupling lenses positioned in the first main body;
         a first top surface;
         a first bottom surface opposite to the first top surface;
         a first outside surface extending between the first top surface and the first bottom surface; and
         a fourth outside surface, opposite the first outside surface, extending between the first top surface and the second bottom surface;
      a cover with:
         a cover top surface;

a cover bottom surface opposite the cover top surface;
a second outside surface extending between the cover top surface and the cover bottom surface; and
a second connector receivable by the first connector and with a plurality second optical coupling lenses positioned therein;
wherein when the second connector is received by the first connector, the plurality of second optical coupling lenses are optically coupled with the plurality of first optical coupling lenses;
wherein the first top surface of the first main body defines a first recess, the first recess having a first inner side surface opposite, and substantially parallel to, the first outside surface; and
wherein there is a receiving indentation defined in the first inner side surface and a second fixing portion attached to the second outside surface, with the second fixing portion configured to be received by the receiving indentation to hold the cover within the first recess.

15. An optical fiber connector comprising:
a first main body and a plurality of first optical coupling lenses;
wherein the optical fiber connector further comprises a first cover matched with the first main body, the first main body comprises a first top surface, a first bottom surface and a first outside surface connecting the first top surface and the first bottom surface, the first top surface defining a first recess, the first recess comprises a first inner side surface parallel to the first outside surface, the first inner side surface defines a first fixing portion, the first cover comprises a second outside surface, the second outside surface comprises a second fixing portion matched with the first fixing portion, the first fixing portion and the second fixing portion are together configured for fixing the first cover with the first main body.

16. The optical fiber connector of claim 15, wherein the first fixing portion is a cutout, the cutout is opened from the top surface and the inner side surface.

17. The optical fiber connector of claim 16, wherein the second fixing portion is substantially U-shaped.

18. The optical fiber connector of claim 17, wherein the second fixing portion comprises a first section, a second section, a connecting section connecting the first section and the second section, and an operation end at a free end of the second section, the first section is connected with the second outside surface.

* * * * *